(12) United States Patent
Won

(10) Patent No.: US 11,195,528 B2
(45) Date of Patent: Dec. 7, 2021

(54) ARTIFICIAL INTELLIGENCE DEVICE FOR PERFORMING SPEECH RECOGNITION

(71) Applicant: LG ELECTRONICS INC., Seoul (KR)

(72) Inventor: Jongpil Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 16/552,930

(22) Filed: Aug. 27, 2019

(65) Prior Publication Data

US 2019/0385606 A1    Dec. 19, 2019

(30) Foreign Application Priority Data

Aug. 6, 2019    (KR) .......................... 10-2019-0095649

(51) Int. Cl.
*G10L 15/22*    (2006.01)
*G10L 15/30*    (2013.01)
*G10L 15/18*    (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC .................................................... 704/1–504
See application file for complete search history.

(56) References Cited

U.S. PATENT DOCUMENTS

| 5,852,804 | A  | * | 12/1998 | Sako .................... B60R 16/0373 |
| | | | | 704/275 |
| 8,202,094 | B2 | * | 6/2012 | Spector ................ G09B 17/006 |
| | | | | 434/169 |
| 8,731,942 | B2 | * | 5/2014 | Cheyer ............... H04M 1/7243 |
| | | | | 704/275 |
| 9,117,447 | B2 | * | 8/2015 | Gruber .................... B60K 35/00 |
| 9,318,108 | B2 | * | 4/2016 | Gruber ................ G06F 16/3329 |
| 9,484,030 | B1 | * | 11/2016 | Meaney ................. H04R 3/005 |
| 9,704,487 | B2 | * | 7/2017 | Lim .................... G01C 21/3664 |
| 9,966,065 | B2 | * | 5/2018 | Gruber .................. G06F 40/205 |
| 10,134,387 | B2 | * | 11/2018 | Bouk ...................... G10L 15/02 |
| 10,446,143 | B2 | * | 10/2019 | Akbacak ............... G06F 40/166 |
| 10,497,365 | B2 | * | 12/2019 | Gruber .................... G10L 15/28 |
| 10,733,993 | B2 | * | 8/2020 | Kudurshian ......... G06F 16/9032 |
| 2013/0110505 | A1 | * | 5/2013 | Gruber .................... G06F 3/167 |
| | | | | 704/9 |
| 2013/0185081 | A1 | * | 7/2013 | Cheyer ............. H04M 1/72448 |
| | | | | 704/275 |
| 2016/0133248 | A1 | * | 5/2016 | Bouk ...................... G10L 15/22 |
| | | | | 704/8 |

(Continued)

*Primary Examiner* — Marcus T Riley
(74) *Attorney, Agent, or Firm* — Birch, Stewart, Kolasch & Birch, LLP

(57) ABSTRACT

An artificial intelligence device for performing speech recognition includes a database configured to store correction data replacing a predetermined speech command, a microphone configured to receive a first speech command from a first user, and a processor configured to store the first speech command in the database when operation to be performed with respect to the first speech command is not determined, acquire correction data replacing the first speech command from a second user, and map and store the first speech command and the correction data in the database.

19 Claims, 11 Drawing Sheets

(56) References Cited

U.S. PATENT DOCUMENTS

| | | | |
|---|---|---|---|
| 2017/0053651 A1* | 2/2017 | Lim | B60R 16/0373 |
| 2018/0182391 A1* | 6/2018 | Lee | G06N 5/02 |
| 2018/0286401 A1* | 10/2018 | Oh | G10L 15/063 |
| 2018/0315426 A1* | 11/2018 | Oh | G10L 15/26 |
| 2019/0115010 A1* | 4/2019 | Yu | G10L 13/04 |
| 2019/0385606 A1* | 12/2019 | Won | G10L 15/22 |

* cited by examiner

ARTIFICIAL INTELLIGENCE DEVICE FOR PERFORMING SPEECH RECOGNITION

CROSS-REFERENCE TO RELATED APPLICATION

This application claims the benefit of Korean Patent Application No. 10-2019-0095649, filed on Aug. 6, 2019 which is hereby incorporated by reference as if fully set forth herein.

BACKGROUND OF THE INVENTION

The present invention relates to an artificial intelligence device capable of acquiring correction data replacing a speech command to perform speech recognition.

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

However, it is difficult to perform speech recognition with respect to a speech uttered by a young child who has not yet learned a language, a person with a strong dialect or a person who has a bad pronunciation.

In addition, there are many difficulties in generating and applying learning data suiting the characteristics of all speakers.

Accordingly, there is an increasing need for an artificial intelligence device capable of recognizing the speeches of various users.

SUMMARY

An object of the present invention is to solve the above-described problem and the other problems.

Another object of the present invention is to provide an artificial intelligence device for providing a speech recognition based service, which is capable of recognizing speeches of various users.

Another object of the present invention is to provide an artificial intelligence device capable of acquiring and learning correction data of a speech command which is hard to be subject to speech recognition, and performing speech recognition.

According to an embodiment of the present invention, provided is an artificial intelligence device for performing speech recognition includes a database configured to store correction data replacing a predetermined speech command, a microphone configured to receive a first speech command from a first user, and a processor configured to store the first speech command in the database when operation to be performed with respect to the first speech command is not determined, acquire correction data replacing the first speech command from a second user, and map and store the first speech command and the correction data in the database.

In addition, in one embodiment of the present invention, the processor may retrieve a speech command having a pattern similar to that of the first speech command from the database and store the first speech command in the database when the speech command having the pattern similar to that of the first speech command is not retrieved.

In addition, in one embodiment of the present invention, the processor may acquire a second speech command from the second user and acquire the second speech command as the correction data replacing the first speech command when the second user is determined as a user authorized to correct data based on the second speech command.

In addition, in one embodiment of the present invention, the processor may acquire a second speech command from the second user and acquire the second speech command as the correction data replacing the first speech command when operation to be performed with respect to the second speech command is determined.

In addition, in one embodiment of the present invention, the processor may acquire text data from the second user and acquire the text data as the correction data replacing the first speech command when operation to be performed with respect to the text data is determined.

In addition, in one embodiment of the present invention, the processor may acquire correction data for modifying prestored correction data replacing the first speech command from the second user and acquire the modified correction data as the correction data replacing the first speech command.

In addition, in one embodiment of the present invention, the microphone may receive a third speech command from the first user, and the processor may acquire correction data replacing the third speech command from the database and determine operation to be performed with respect to the correction data replacing the third speech command to perform speech recognition.

In addition, in one embodiment of the present invention, the processor may retrieve a speech command having a pattern similar to that of the third speech command from the database and acquire correction data replacing the retrieved speech command having the similar pattern as the correction data replacing the third speech command.

The artificial intelligence device may further include a communication unit configured to transmit the correction data replacing the third speech command to a natural language processing (NLP) server for performing intention analysis, and the processor may acquire intention analysis information from the NLP server to perform speech recognition.

According to another embodiment of the present invention, provided is a speech recognition method performed by an artificial intelligence device including a database for storing correction data replacing a predetermined speech command including receiving a first speech command from a first user, storing the first speech command in the database when operation to be performed with respect to the first speech command is not determined, acquiring correction data replacing the first speech command from a second user, and mapping and storing the first speech command and the acquired correction data in the database.

In addition, in one embodiment of the present invention, the storing of the first speech command in the database may include retrieving a speech command having a pattern similar to that of the first speech command from the database and storing the first speech command in the database when the speech command having the pattern similar to that of the first speech command is not retrieved.

In addition, in one embodiment of the present invention, the acquiring of the correction data replacing the first speech command may include acquiring a second speech command from the second user and acquiring the second speech command as the correction data replacing the first speech command when the second user is determined as a user authorized to correct data based on the second speech command.

In addition, in one embodiment of the present invention, the acquiring of the correction data replacing the first speech command may include acquiring a second speech command from the second user and acquiring the second speech command as the correction data replacing the first speech command when operation to be performed with respect to the second speech command is determined.

In addition, in one embodiment of the present invention, the acquiring of the correction data replacing the first speech command may include acquiring text data from the second user and acquiring the text data as the correction data replacing the first speech command when operation to be performed with respect to the text data is determined.

In addition, in one embodiment of the present invention, the acquiring of the correction data replacing the first speech command may include acquiring correction data for modifying prestored correction data replacing the first speech command from the second user and acquiring the modified correction data as the correction data replacing the first speech command.

In addition, in one embodiment of the present invention, the speech recognition method may further include receiving a third speech command from the first user, acquiring correction data replacing the third speech command from the database, and performing speech recognition by determining operation to be performed with respect to the correction data replacing the third speech command.

In addition, in one embodiment of the present invention, the acquiring of the correction data replacing the third speech command from the database may include retrieving a speech command having a pattern similar to that of the third speech command from the database and acquiring correction data replacing the retrieved speech command having the similar pattern as the correction data replacing the third speech command.

In addition, in one embodiment of the present invention, the performing of the speech recognition may include transmitting the correction data replacing the third speech command to a natural language processing (NLP) server for performing intention analysis and acquiring intention analysis information from the NLP server to perform speech recognition.

According to another embodiment of the present invention, provided is an artificial intelligence device for performing speech recognition including a database configured to store correction data replacing a predetermined speech command, a microphone configured to receive a speech command from a user, and a processor configured to acquire correction data replacing the speech command from the database and determining operation to be performed with respect to the correction data replacing the speech command to perform speech recognition.

DETAILED DESCRIPTION OF THE EMBODIMENTS

Figure 1:
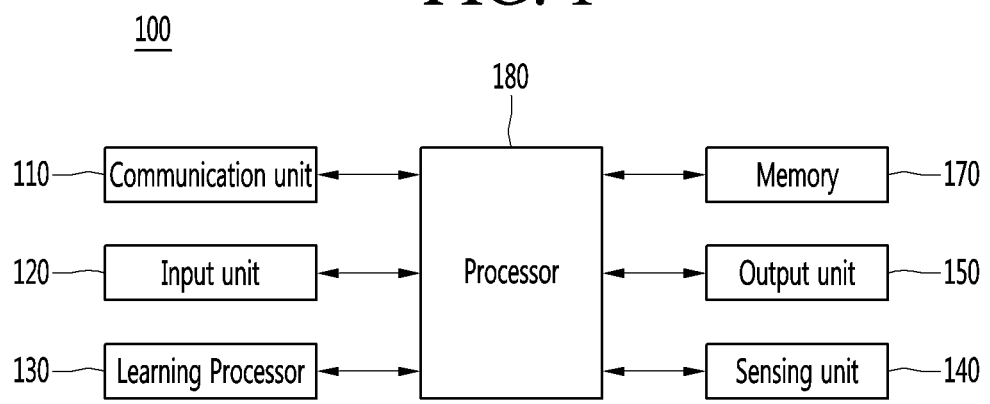
FIG. 1 illustrates an AI device 100 according to an embodiment of the present invention.

Hereinafter, embodiments of the present disclosure are described in more detail with reference to accompanying drawings and regardless of the drawing symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 420 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 420.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 420, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 420. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
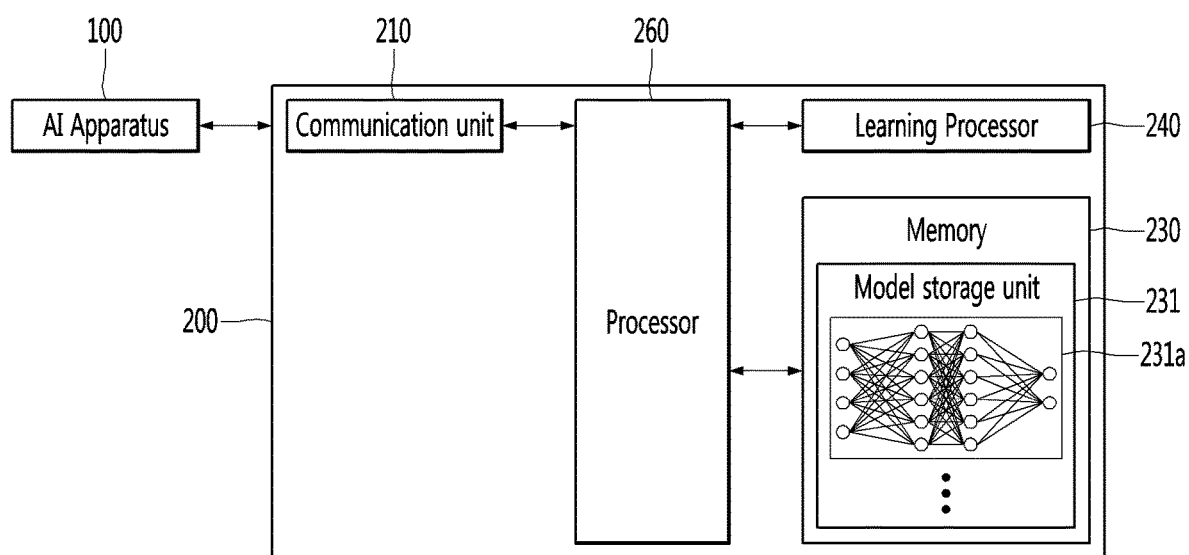
FIG. 2 illustrates an AI server 420 according to an embodiment of the present invention.

FIG. 2 illustrates an AI server 420 according to an embodiment of the present invention.

Referring to FIG. 2, the AI server 420 may refer to a device that learns an artificial neural network by using a machine learning algorithm or uses a learned artificial neural network. The AI server 420 may include a plurality of servers to perform distributed processing, or may be defined as a 5G network. At this time, the AI server 420 may be included as a partial configuration of the AI device 100, and may perform at least part of the AI processing together.

The AI server 420 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 420 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
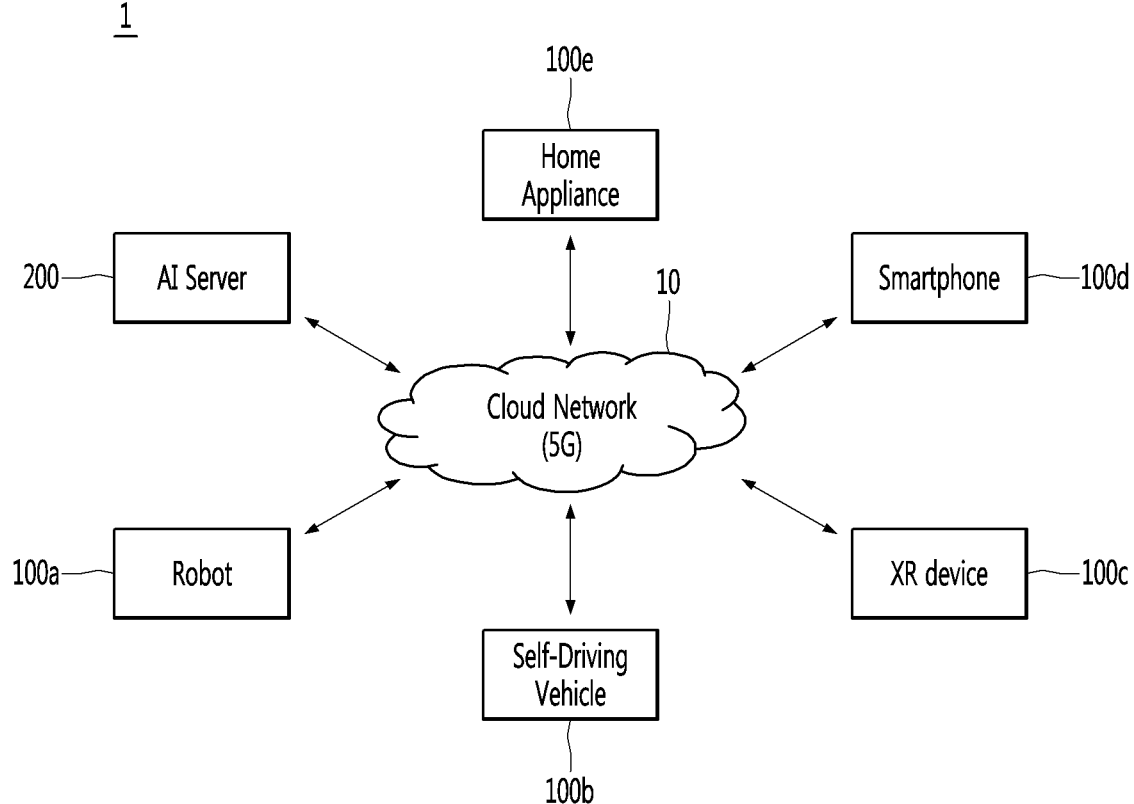
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 420, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 420 may include a server that performs AI processing and a server that performs operations on big data.

The AI server 420 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 420 may learn the artificial neural network according to the machine learning algorithm instead of the AI devices 100a to 100e, and may directly store the learning model or transmit the learning model to the AI devices 100a to 100e.

At this time, the AI server 420 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 420.

At this time, the robot 100a may perform the operation by generating the result by directly using the learning model, but the sensor information may be transmitted to the external device such as the AI server 420 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 420.

At this time, the self-driving vehicle 100b may perform the operation by generating the result by directly using the learning model, but the sensor information may be transmitted to the external device such as the AI server 420 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 420.

At this time, the XR device 100c may perform the operation by generating the result by directly using the learning model, but the sensor information may be transmitted to the external device such as the AI server 420 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
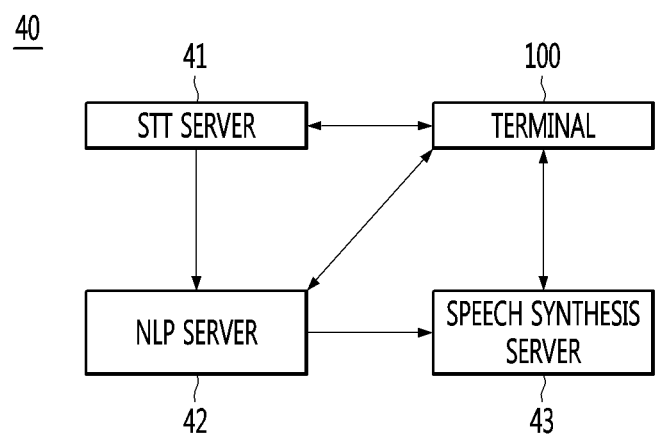
FIG. 4 is a diagram illustrating a speech system according to an embodiment of the present invention.

FIG. 4 is a diagram illustrating a speech system according to an embodiment of the present invention.

Referring to FIG. 4, the speech system 40 includes an artificial intelligence device 100, a speech-to-text (STT) server 41, a natural language processing (NLP) server 42 and a speech synthesis server 43.

The artificial intelligence device 100 may transmit speech data to the STT server 41.

The STT server 41 may convert the speech data received from the artificial intelligence device 100 into text data.

The STT server 41 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 41 may determine when the speech data is appropriately converted into the text data using the language model, thereby increasing accuracy of conversion into the text data.

The NLP server 42 may receive the text data from the STT server 41. The NLP server 42 may analyze the intention of the text data based on the received text data.

The NLP server 42 may transmit intention analysis information indicating the result of performing intention analysis to the artificial intelligence device 100.

The NLP server 42 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 42 may generate intention analysis information including at least one of the answer to, a response to, or a question about more information on the intention of the user's utterance, after the dialog processing step.

Meanwhile, the NLP server 42 may receive the text data from the artificial intelligence device 100. For example, when the artificial intelligence device 100 supports the speech-to-text conversion function, the artificial intelligence device 100 may convert the speech data into the text data and transmit the converted text data to the NLP server 42.

The speech synthesis server 43 may synthesize prestored speech data to generate a synthesized speech.

The speech synthesis server 43 may record the speech of the user selected as a model and divide the recorded speech into syllables or words. The speech synthesis server 43 may store the divided speech in an internal or external database in syllable or word units.

The speech synthesis server 43 may retrieve syllables or words corresponding to the given text data from the database and synthesize the retrieved syllables or words, thereby generating the synthesized speech.

The speech synthesis server 43 may store a plurality of speech language groups respectively corresponding to a plurality of languages.

For example, the speech synthesis server 43 may include a first speech language group recorded in Korean and a second speech language group recorded in English.

The speech synthesis server 43 may translate text data of a first language into text of a second language and generate a synthesized speech corresponding to the translated text of the second language using the second speech language group.

The speech synthesis server 43 may transmit the synthesized speech to the artificial intelligence device 100.

The speech synthesis server 43 may receive the intention analysis information from the NLP server 42.

The speech synthesis server 43 may generate the synthesized speech including the intention of the user based on the intention analysis information.

In one embodiment, the STT server 41, the NLP server 42 and the speech synthesis server 43 may be implemented as one server.

The respective functions of the STT server 41, the NLP server 42 and the speech synthesis server 43 may also be performed in the artificial intelligence device 100. To this end, the artificial intelligence device 100 may include a plurality of processors.

The respective functions of the STT server 41, the NLP server 42 and the speech synthesis server 43 may also be performed in the artificial intelligence device 200. To this end, the artificial intelligence device 200 may include a plurality of processors.

Figure 5:
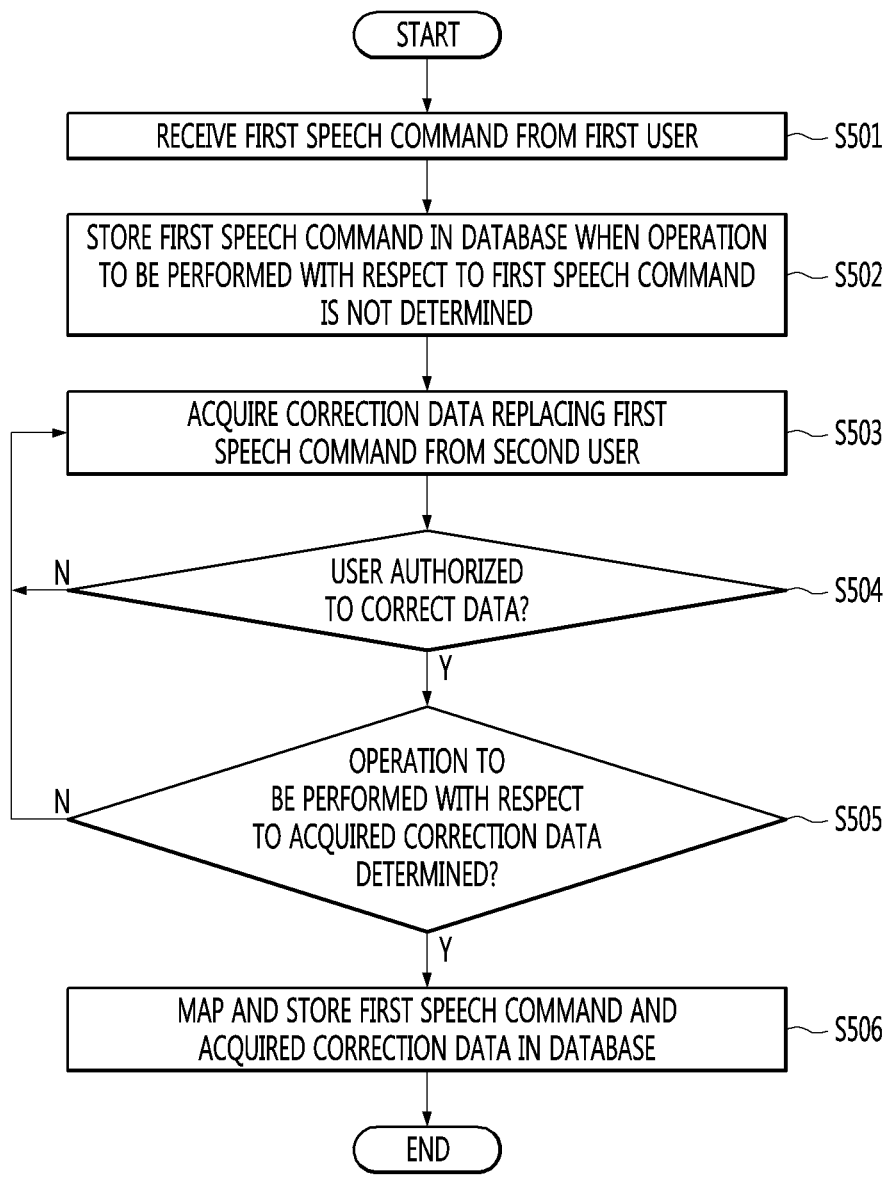
FIG. 5 is a diagram illustrating a method of collecting learning data optimized for user characteristics by storing correction data of a speech command according to an embodiment of the present invention.
Figure 6:
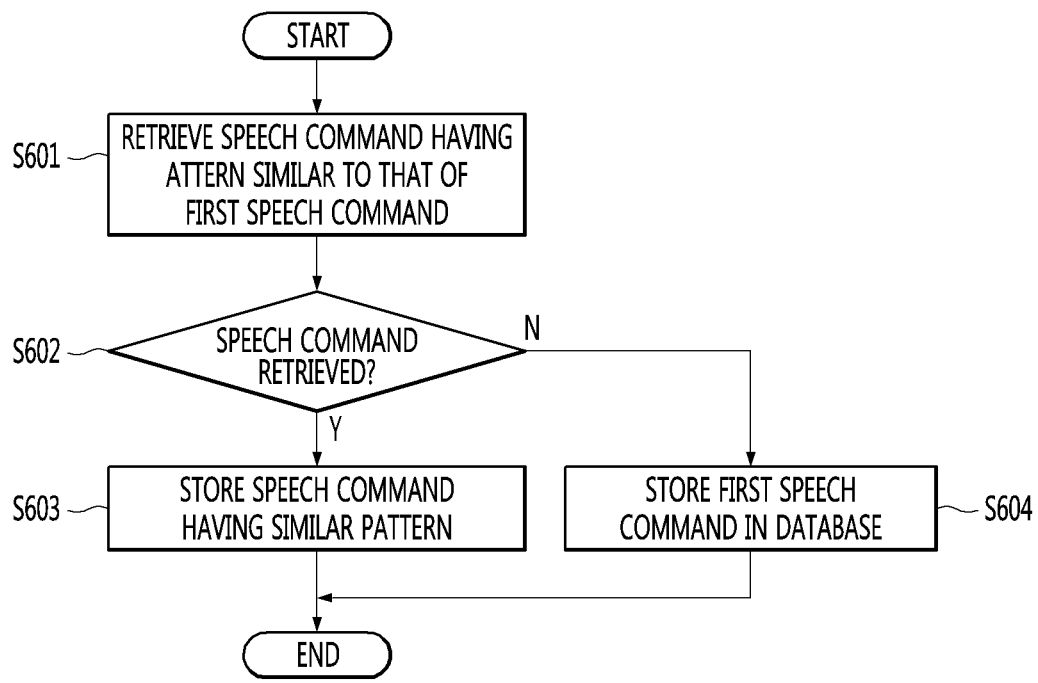
FIG. 6 is a flowchart illustrating a method of storing correction data of a speech command according to an embodiment of the present invention.

FIGS. 5 and 6 are diagrams illustrating a method of collecting learning data optimized for user characteristics by storing correction data of a speech command according to an embodiment of the present invention.

An artificial intelligence device including a database 171 (see FIG. 8) for storing correction data replacing a predetermined speech command may perform speech recognition.

The memory 170 of the artificial intelligence device 100 may include the database 171 for storing the correction data replacing the predetermined speech command. The database 171 may be included in the memory 230 of the artificial intelligence server 200.

The database 171 may store correction data replacing the predetermined speech command in the form of an "index", "speech command data" and "correction data mapped to a speech mapping command".

Referring to FIG. 5, the input unit 120 of the artificial intelligence device 100 may receive a first speech command from a first user (S501).

The input unit 120 may include a microphone for receiving a speech command from a user. The microphone of the input unit 120 may receive the first speech command from the first user.

The processor 180 may store the first speech command in the database when operation to be performed with respect to the first voice command is not determined (S502).

The case where operation to be performed with respect to the speech command is not determined may include the case where the artificial intelligence device 100 cannot perform operation corresponding to the speech command.

For example, the processor 180 may acquire a speech command "Hi! LG" from the user through the input unit 120.

The artificial intelligence device 100 may determine that operation of entering a state of waiting for a next speech command needs to be performed while outputting a speech "Yes, did you call me?".

Meanwhile, when the pronunciation of the speech command "Hi! LG" is unclear or the speech command "Hi! LG" has low sound, the artificial intelligence device 100 may not determine operation to be performed with respect to the speech command "Hi! LG".

Referring to FIG. 6, when the first speech command is stored in the database, the processor 180 may retrieve a speech command having a pattern similar to that of the first speech command from the database (S601).

In addition, the processor 180 may determine whether the speech command having the pattern similar to that of the first speech command is retrieved (S602).

The processor 180 may store the speech command having the similar pattern when the speech command having the pattern similar to that of the first speech command is retrieved (S603).

In addition, the processor 180 may not store the first speech command when the speech command having the pattern similar to that of the first speech command is retrieved. Accordingly, it is possible to efficiently manage the capacity of the database while redundantly storing the speech command.

In addition, the processor 180 may store the first speech command in the database when the speech command having the pattern similar to that of the first speech command is not retrieved (S604).

Referring to FIG. 5 again, the processor 180 may acquire correction data replacing the first speech command from a second user (S503).

The processor 180 may acquire the correction data through the input unit 120 of the artificial intelligence device 100 or from the other artificial intelligence devices 100*a* to 100*e* or the artificial intelligence server 200 using wired/wireless communication technology through the communication unit 110.

The processor 180 may acquire a second speech command from a second user through the input unit 120.

The processor 180 may acquire text data from the second user through the input unit 120.

For example, when the first speech command "Is the weekend weather warm?" received from the first user is a strong dialect, the processor 180 may acquire a speech command "Is the weather warm on weekends?" which is the correction data replacing the first speech command from the second user or text data "Is the weather warm on weekends?".

In addition, when the artificial intelligence device 100 enters the learning mode of the speech command, the processor 180 may enable the second user to input the correction data replacing the first speech command.

In addition, the processor 180 may determine whether the second user is authorized to correct data (S504).

The processor 180 may determine whether the second user is authorized to correct data based on the second speech command acquired from the second user.

For example, the processor 180 may acquire one or more speech data from the second user and store the acquired speech data or feature information of the speech data, thereby registering the second user as a user authorized to correct data.

The processor 180 may determine whether the second user is authorized to correct data, by comparing the second speech command acquired from the second user with the prestored speech data or the feature information of the speech data of the user, who is authorized to correct data, and determining whether the speeches are uttered by the same speaker.

In addition, upon determining that the second user is authorized to correct data, the processor 180 may check whether operation to be performed with respect to the acquired correction data is determined (S505).

The processor 180 may acquire the second speech command from the second user and acquire the second speech command as the correction data replacing the first speech command when the operation to be performed with respect to the second speech command is determined.

In addition, the processor 180 may acquire the text data from the second user and acquire the text data as the correction data replacing the first speech command, when the operation to be performed with respect to the text data is determined.

For example, the processor 180 may acquire the second speech command "Hi! LG" from the second user as the correction data replacing the first speech command "Hi! LG" with a bad pronunciation or low sound problem. In this case, the processor 180 may determine whether the artificial intelligence device 100 needs to perform operation of entering a state of waiting for a next speech command while outputting a speech "Yes, did you call me?", based on the speech command "Hi! LG" acquired from the second user. When the operation to be performed is determined, the processor 180 may acquire the speech command "Hi! LG" acquired from the second user as the correction data replacing the first speech command. Accordingly, it is possible to guarantee the quality of the correction data of the first speech command.

In addition, for example, the processor 180 may acquire the text data "Hi! LG" from the second user as the correction data replacing the first speech command "Hi! LG" with a bad pronunciation or low sound problem. In this case, the processor 180 may determine whether the artificial intelligence device 100 needs to perform operation of entering a state of waiting for a next speech command while outputting a speech "Yes, did you call me?", based on the text data "Hi! LG" acquired from the second user. When the operation to be performed is determined, the processor 180 may acquire the text data "Hi! LG" acquired from the second user as the correction data replacing the first speech command. Accordingly, it is possible to guarantee the quality of the correction data of the first speech command.

The processor 180 may acquire correction data for correcting prestored correction data replacing the first speech command from the second user.

In addition, the processor 180 may acquire the correction data for correcting the prestored correction data replacing the first speech command as the correction data replacing the first speech command.

For example, when the prestored correction data replacing the first speech command "Is the weekend weather warm?" is text data "Is the weather warm on weekends?", the processor 180 may acquire the text data "Is the weather warm on weekends?" which is the correction data for correcting the text data "Is the weekend weather warm?". In addition, the processor 180 may acquire the text data "Is the weather warm on weekends?" as the correction data replacing the first speech command "Is the weekend weather warm?" and store the text data in the database 171.

The processor 180 may map and store the first speech command and the acquired correction data in the database (S506).

The database 171 may be configured in the form of "index", "speech command data" or "correction data mapped to a speech mapping command".

For example, the processor 180 may map and store the first speech command "Hi! LG", speech recognition of which is impossible due to a bad pronunciation, and the correction data acquired from the second user in the database 171 based on the same index.

Figure 7:
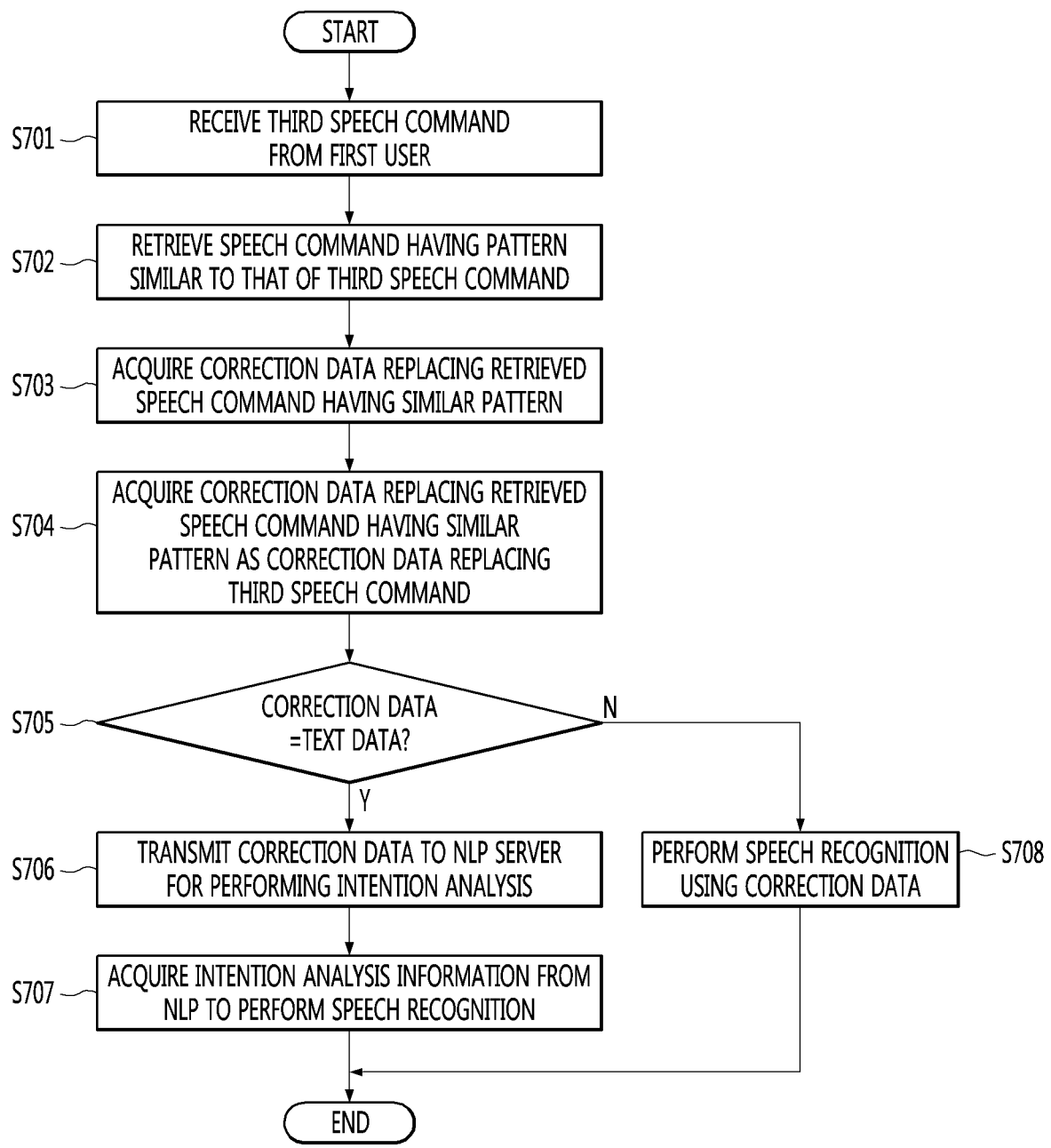
FIG. 7 is a flowchart illustrating a method of performing speech recognition using correction data of a speech command according to an embodiment of the present invention.

FIG. 7 is a flowchart illustrating a method of performing speech recognition using correction data of a speech command according to an embodiment of the present invention.

The microphone of the input unit 120 may receive a third speech command from a first user (S701).

The processor 180 acquire the correction data replacing the third speech command from the database and determine operation to be performed with respect to the correction data replacing the third speech command to perform speech recognition.

The processor 180 may acquire the correction data replacing the third speech command from the database.

The processor 180 may determine operation to be performed with respect to the correction data replacing the third speech command to perform speech recognition.

The processor 180 may retrieve a speech command having a pattern similar to that of the third speech command (S702).

The processor 180 may acquire the correction data mapped to the retrieved speech command having the similar pattern (S703).

The processor 180 may acquire the correction data replacing the retrieved speech command having the similar pattern as the correction data replacing the third speech command (S704).

The processor 180 may determine whether the acquired correction data is text data (S705).

When the correction data is text data, the processor 180 may transmit the correction data to the NLP server 42 for performing intention analysis (S706).

The processor 180 may acquire intention analysis information from the NLP server 42 to perform speech recognition (S707).

When the correction data is not text data, the processor 180 may perform speech recognition using the correction data (S708).

In addition, the processor 180 may acquire intention information corresponding to the correction data using at least one of a speech-to-text (STT) engine for converting correction data into a character string or a natural language processing (NLP) engine for acquiring intention information of a natural language.

Figure 8:
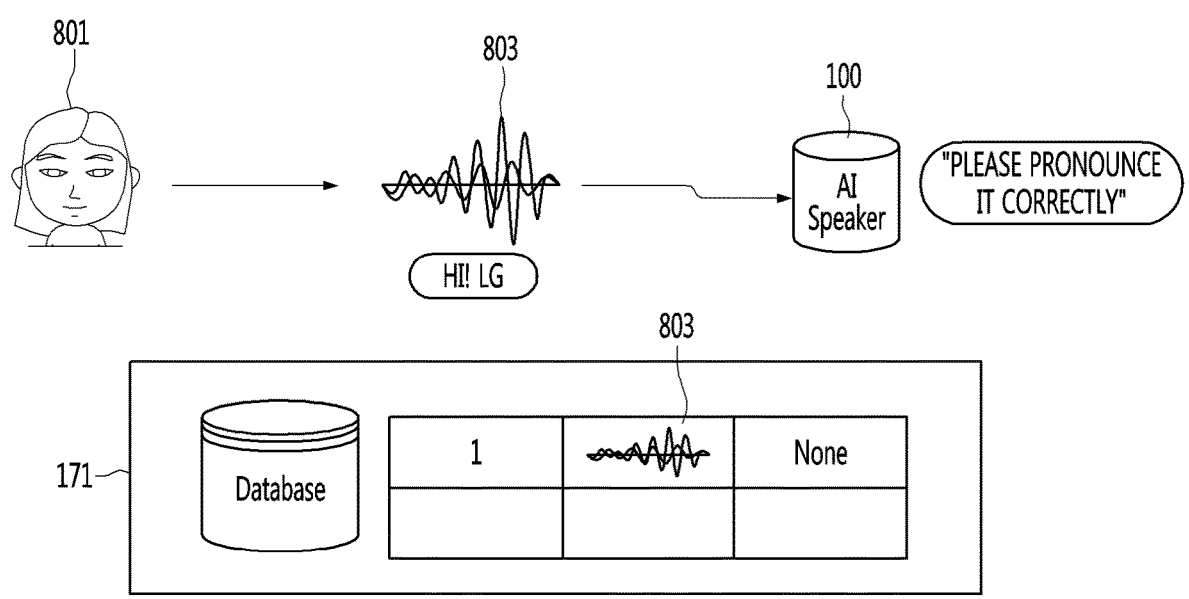
FIGS. 8 to 10 are diagrams illustrating a process of collecting correction data of a speech command and performing speech recognition using correction data at an artificial intelligence device according to an embodiment of the present invention.
Figure 9:
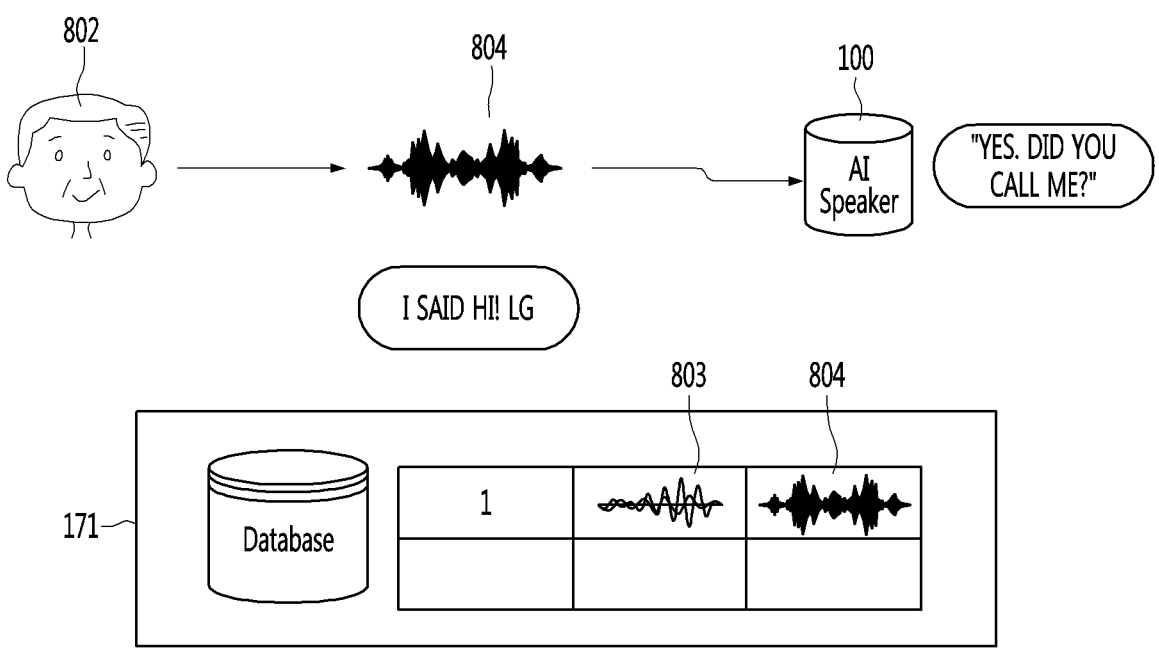
Figure 10:
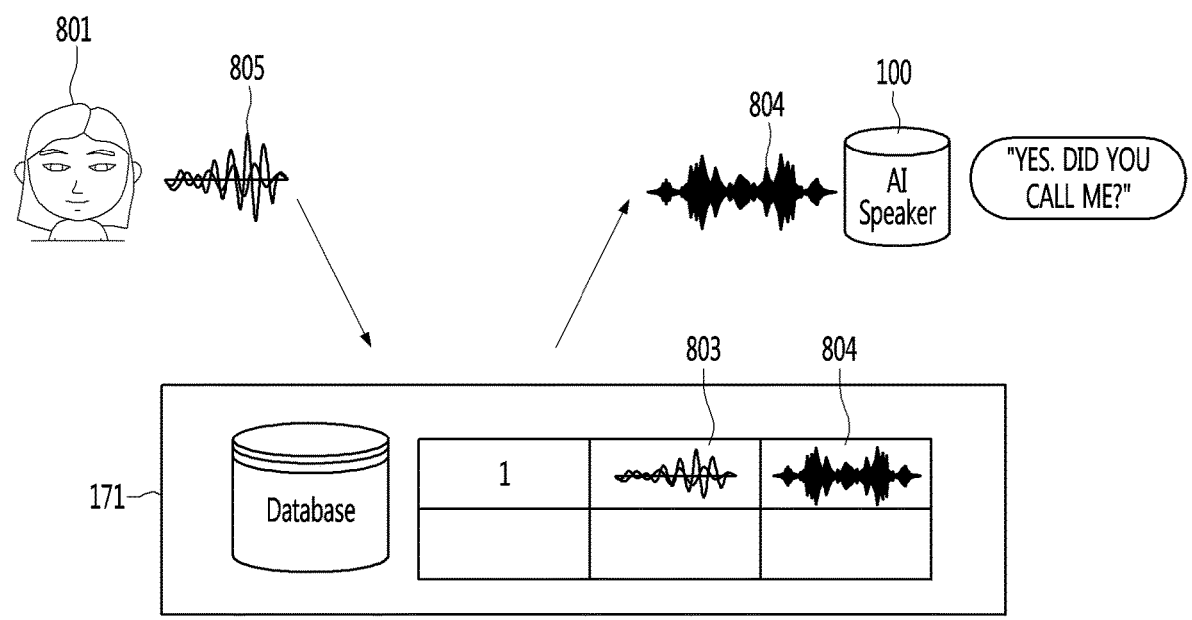

FIGS. 8 to 10 are diagrams illustrating a process of collecting correction data of a speech command and performing speech recognition using correction data at an artificial intelligence device according to an embodiment of the present invention.

Referring to FIGS. 8 to 10, a first user 801 is a young child and may have a bad pronunciation. The artificial intelligence device 100 may be an artificial intelligence speaker, but is not limited thereto and may include a communication robot disposed in the home.

The processor 180 of the artificial intelligence device 100 may acquire a first speech command 803 "Hi! LG" having a bad pronunciation from the first user 801 through the microphone of the input unit 120.

In addition, since operation to be performed with respect to the first speech command 803 is not determined, the processor 180 of the artificial intelligence device 100 may output a message "Please pronounce it correctly".

In addition, since operation to be performed with respect to the first speech command 803 is not determined, the processor 180 may store the first speech command 803 in the database 171.

The processor 180 may retrieve a speech command having a pattern similar to that of the first speech command 803 from the database 171. In this case, since the speech command having the pattern similar to that of the first speech command 803 is not retrieved from the database 171, the first speech command 803 may be stored, and may be stored without being mapped with the correction data replacing the first speech command 803.

The processor 180 may acquire a second speech command 804 from the second user 802 as the correction data replacing the first voice command 803.

Since operation of outputting a message "Yes, did you call me?" which is operation to be performed with respect to the second speech command 804 is determined, the processor 180 may acquire the second speech command 804 as correction data replacing the first speech command 803, and map and store the first speech command 803 and the correction data 804 in the database 171.

The processor 180 may acquire a third speech command 805 from the first user 801 through the microphone of the input unit 120.

The processor 180 may retrieve the speech command 803 having a pattern similar to that of the third speech command 805 from the database 171 and acquire the correction data 804 replacing the retrieved speech command 803 having the similar pattern as the correction data 804 replacing the third speech command 805. Accordingly, the processor 180 of the artificial intelligence device 100 may determine operation of outputting the message "Yes, did you call me?" which is operation to be performed with respect to the correction data 804 replacing the third speech command 805 and perform speech recognition.

Figure 11:
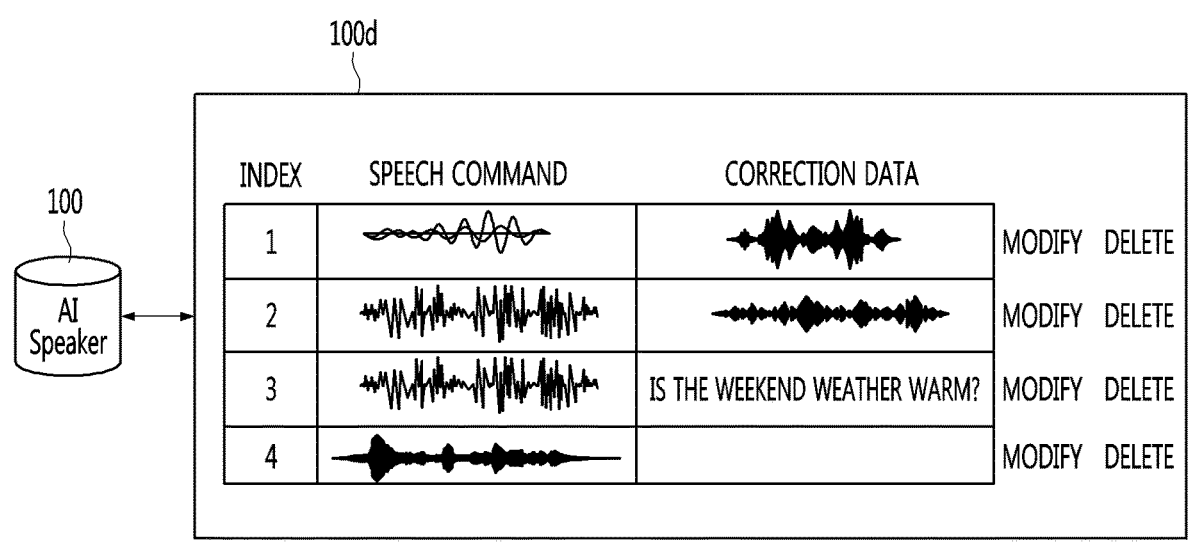
FIG. 11 is a diagram illustrating a process of adding or editing correction data of a speech command stored in an artificial intelligence device according to an embodiment of the present invention.

FIG. 11 is a diagram illustrating a process of adding or editing correction data of a speech command stored in an artificial intelligence device according to an embodiment of the present invention.

The communication unit 110 of the artificial intelligence device 100 may transmit and receive data to and from a smartphone 100d using wired/wireless communication technology and transmit and receive data stored in the database 171 of the artificial intelligence device 100.

In addition, the smartphone 100d may output the data of the database 171 on a screen.

For example, the communication unit 110 of the artificial intelligence device 100 may transmit the speech command stored in the database 171 and the correction data mapped to the speech command to the smartphone 100d. In this case, the artificial intelligence device 100 may determine whether the smartphone 100d is authorized to access data.

The smartphone 100d may output the speech command received from the artificial intelligence device 100 and the correction data mapped to the speech correction command.

In addition, the smartphone 100d may provide an interface for enabling the authorized second user to modify or delete the correction data of the database 171.

For example, the smartphone 100d may output four speech commands received from the artificial intelligence device 100 and the correction data mapped to the respective speech commands through the display. The smartphone 100d may provide an interface capable of deleting or modifying the correction data mapped to the respective speech commands. In addition, when there is no correction data mapped to the speech command, the smartphone 100d may provide an interface for enabling the authorized second user to input the correction data and learning the correction data replacing the speech command.

In addition, the artificial intelligence device 100d may receive the correction data learned or modified in the smartphone 100d through the communication unit 110, and update the database 171 with the learned or modified correction data.

According to the embodiment of the present invention, it is possible to increase the speech recognition rate of users such as a young child, a person with a strong dialect or a user who has a bad pronunciation.

According to the embodiment of the present invention, it is possible to generate and apply speech learning data suiting the characteristics of all speakers.

According to the embodiment of the present invention, it is possible to provide speech recognition performance optimized for a specific user, by enabling a third party to perform speech correction learning.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the terminal.

What is claimed is:

1. An artificial intelligence device for performing speech recognition, the artificial intelligence device comprising:
   a database configured to store correction data replacing a predetermined speech command;
   a microphone configured to receive a first speech command from a first user; and
   a processor configured to store the first speech command in the database when operation to be performed with respect to the first speech command is not determined, acquire a second speech command or text data as correction data replacing the first speech command from a second user, and map and store the first speech command and the correction data in the database.

2. The artificial intelligence device according to claim 1, wherein the processor retrieves a speech command having a pattern similar to that of the first speech command from the database and stores the first speech command in the database when the speech command having the pattern similar to that of the first speech command is not retrieved.

3. The artificial intelligence device according to claim 1, wherein the processor acquires the second speech command from the second user and acquires the second speech command as the correction data replacing the first speech command when the second user is determined as a user authorized to correct data based on the second speech command.

4. The artificial intelligence device according to claim 1, wherein the processor acquires the second speech command from the second user and acquires the second speech command as the correction data replacing the first speech command when operation to be performed with respect to the second speech command is determined.

5. The artificial intelligence device according to claim 1, wherein the processor acquires the text data from the second user and acquires the text data as the correction data replacing the first speech command when operation to be performed with respect to the text data is determined.

6. The artificial intelligence device according to claim 1, wherein the processor acquires correction data for modifying prestored correction data replacing the first speech command from the second user and acquires the modified prestored correction data as the correction data replacing the first speech command.

7. The artificial intelligence device according to claim 1,
wherein the microphone receives a third speech command from the first user, and
wherein the processor acquires correction data replacing the third speech command from the database and determines operation to be performed with respect to the correction data replacing the third speech command to perform speech recognition.

8. The artificial intelligence device according to claim 7, wherein the processor retrieves a speech command having a pattern similar to that of the third speech command from the database and acquires correction data replacing the retrieved speech command having the similar pattern as the correction data replacing the third speech command.

9. The artificial intelligence device according to claim 7, further comprising a communication unit configured to transmit the correction data replacing the third speech command to a natural language processing (NLP) server for performing intention analysis,
wherein the processor acquires intention analysis information from the NLP server to perform speech recognition.

10. A speech recognition method performed by an artificial intelligence device including a database for storing correction data replacing a predetermined speech command, the speech recognition method comprising:
receiving a first speech command from a first user;
storing the first speech command in the database when operation to be performed with respect to the first speech command is not determined;
acquiring a second speech command or text data as correction data replacing the first speech command from a second user; and
mapping and storing the first speech command and the acquired correction data in the database.

11. The speech recognition method according to claim 10, wherein the storing of the first speech command in the database includes:
retrieving a speech command having a pattern similar to that of the first speech command from the database; and
storing the first speech command in the database when the speech command having the pattern similar to that of the first speech command is not retrieved.

12. The speech recognition method according to claim 10, wherein the acquiring of the correction data replacing the first speech command includes:
acquiring the second speech command from the second user; and
acquiring the second speech command as the correction data replacing the first speech command when the second user is determined as a user authorized to correct data based on the second speech command.

13. The speech recognition method according to claim 10, wherein the acquiring of the correction data replacing the first speech command includes:
acquiring the second speech command from the second user; and
acquiring the second speech command as the correction data replacing the first speech command when operation to be performed with respect to the second speech command is determined.

14. The speech recognition method according to claim 10, wherein the acquiring of the correction data replacing the first speech command includes:
acquiring the text data from the second user; and
acquiring the text data as the correction data replacing the first speech command when operation to be performed with respect to the text data is determined.

15. The speech recognition method according to claim 10, wherein the acquiring of the correction data replacing the first speech command includes:
acquiring correction data for modifying prestored correction data replacing the first speech command from the second user; and
acquiring the modified prestored correction data as the correction data replacing the first speech command.

16. The speech recognition method according to claim 10, further comprising: receiving a third speech command from the first user;
acquiring correction data replacing the third speech command from the database; and
performing speech recognition by determining operation to be performed with respect to the correction data replacing the third speech command.

17. The speech recognition method according to claim 16, wherein the acquiring of the correction data replacing the third speech command from the database includes:
retrieving a speech command having a pattern similar to that of the third speech command from the database; and
acquiring correction data replacing the retrieved speech command having the similar pattern as the correction data replacing the third speech command.

18. The speech recognition method according to claim 16, wherein the performing of the speech recognition includes:
transmitting the correction data replacing the third speech command to a natural language processing (NLP) server for performing intention analysis; and
acquiring intention analysis information from the NLP server to perform speech recognition.

19. An artificial intelligence device for performing speech recognition, the artificial intelligence device comprising:
a database configured to store correction data replacing a predetermined speech command;
a microphone configured to receive a first speech command from a first user; and
a processor configured to store the first speech command in the database when operation to be performed with respect to the first speech command is not determined, acquire correction data replacing the first speech command from a second user, and map and store the first speech command and the correction data in the database, wherein the processor acquires correction data for modifying prestored correction data replacing the first speech command from the second user and acquires the modified prestored correction data as the correction data replacing the first speech command.

\* \* \* \* \*